Figure 1:
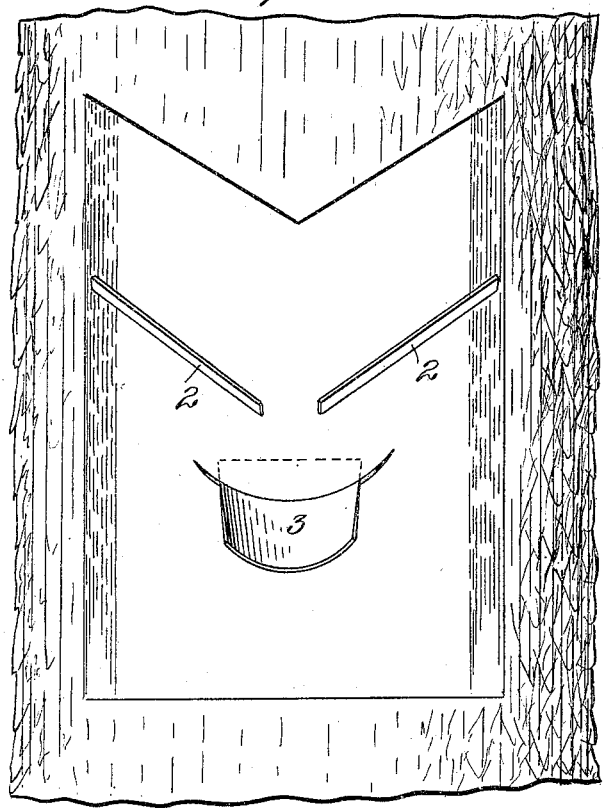

No. 807,702. PATENTED DEC. 19, 1905.
E. L. VICKERS.
TURPENTINE GATHERING MEANS.
APPLICATION FILED AUG. 4, 1905.

Witnesses:
G. D. Kesler
James L. Norris, Jr.

Inventor
Elias L. Vickers
By James L. Norris
Atty.

UNITED STATES PATENT OFFICE.

ELIAS L. VICKERS, OF TIFTON, GEORGIA.

TURPENTINE-GATHERING MEANS.

No. 807,702.   Specification of Letters Patent.   Patented Dec. 19, 1905.

Application filed August 4, 1905. Serial No. 272,743.

*To all whom it may concern:*

Be it known that I, ELIAS L. VICKERS, a citizen of the United States, residing at Tifton, in the county of Berrien and State of Georgia, have invented new and useful Improvements in Turpentine-Gathering Means, of which the following is a specification.

This invention relates to turpentine-gathering means, the object of the invention being to provide an organization which can be readily applied to a tree, which is inexpensive, and which results in the collection of turpentine in a desirable quantity and of prime condition.

In the drawings accompanying and forming a part of this specification I illustrate an organization of parts involving my invention, which I will set forth in detail in the following description, while the novelty of the invention will be embraced in the claims succeeding said description.

Figure 2:
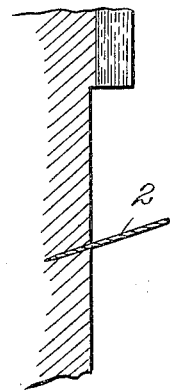
Figure 3:
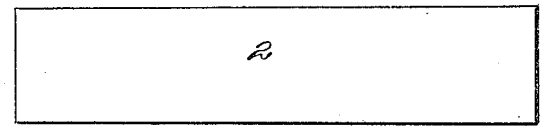

In the drawings, Figure 1 is a front elevation of turpentine-gathering means involving my invention and showing the same applied to a tree. Fig. 2 is a cross-section taken through one of the plates or guides and through the adjacent part of the tree. Fig. 3 is a top plan view of one of said plates or guides.

Like characters refer to like parts throughout the several views.

The turpentine-gathering means involves in its make-up two side guides, each designated by 2 and consisting of a flat plate, which may be made of tin, galvanized iron, or other suitable material. These guides or plates, as set forth, are flat and are not guttered or channeled. I secure any advantages that follow the use of gutters or channels by associating the guides with a tree in a novel manner. Initially I remove the bark from the tree, after which I cut into the exposed surface thereof two incisions at an angle to each other. The angle is preferably an obtuse one. The incisions may be formed in the exposed surface of the tree each at a single operation by an ax or other suitable edged implement. Into the incisions I insert the inner edges of the two guides or plates 2, which, it will be understood, when in operative position are located at an obtuse angle to each other. When the guides are inserted in the incisions or cuts, the walls of the latter close upon the inner edges of the former to hold them in proper and firm relation with the tree.

The lower ends of the two guides or plates terminate at a common horizontal plane, but are separated to provide a mouth or space through which the turpentine from the guides can flow onto a suitable device, as the lip 3. The turpentine can be conducted from the lip to a box cut in the tree or to a receptacle separate from the tree and attached thereto in any desirable way. Any means can be provided for securing the transfer of the turpentine from the lip to the box or receptacle, this particular feature forming no part of my invention.

The incisions cut into the tree are upon a downward and inward slant, so that when the guides or plates are inserted into the incisions they will stand at an upward and outward angle to the tree in order to provide comparatively shallow channels, one wall of each of which is composed of the upper or inner surface of a plate, while the opposite wall is composed of the exposed surface of the tree. By virtue of the fact that the guides or plates stand at an upward and outward angle there is no possibility of waste of the turpentine ensuing. It will be understood that the turpentine-gum which exudes from the tree passes onto the two guides or plates 2, flows down the same, and through the space between their lower ends onto the lip 3.

By virtue of the downward and inward slant of the incisions or cuts made into the tree to receive the guides or plates 2 the latter not only stand at an upward angle with respect to the tree, but they are prevented from dropping from place, which they would be very apt to do were the incisions at an upward and inward inclination. There are no projections upon the lateral or side edges of the plates, such lateral or side edges being in parallelism throughout the entire length of each plate. The latter, in fact, are simply two flat pieces.

The lip 3 is adapted to extend at a downward angle from the tree. The lip 3 is of trough-like form or is curved in cross-section, its inner and forward edges being in parallelism and straight or extending at right angles to the length of the lip. The straight inner edge of the lip 3 is intended to be inserted into an arcuate incision or cut in the tree, and when the upper and lower walls of the incision close on the lip the latter will be firmly and securely held in place. The turpentine from the lip or spout 3 can flow directly into a box cut in the tree or into a suitable receptacle mounted thereupon or can be conducted into such box or receptacle by independent means. The forward portion of the lip is transversely dished or troughed to prevent lateral flow of the turpentine and accurately guide the same downward.

It will be understood that the lip 3 or the intermediate portion thereof is located directly under the mouth or space between the lower ends of the complemental guides or plates 2.

By reason of the invention there is no possibility of any of the parts making up the turpentine-gathering means falling from place. They can be mounted in proper position by the formation of shallow slits, and in this way the tree is not weakened.

Having thus described my invention, what I claim is—

1. Turpentine-gathering means involving two flat plates arranged at angles to each other and to fit in incisions in a tree, said incisions being formed in the tree upon a downward and inward slant to bring the plates at an upward and outward slant with respect to the tree and with the lower ends of the plates extending to a substantially common horizontal plane and separated to provide a space or mouth for the flow of the turpentine.

2. Turpentine-gathering means involving two flat plates arranged at angles to each other and to fit in incisions in a tree, said incision being upon a downward and inward slant to bring the plates at an upward and outward slant with respect to the tree and with the lower ends of the plates extending to a substantially common horizontal plane and separated to provide a space or mouth for the flow of the turpentine, and a lip of trough form located below the mouth or space between the plates, standing at an inclination with respect to the tree, the latter having an incision to receive said lip and to hold it in place at a downward inclination.

In testimony whereof I have hereunto set my hand in presence of two subscribing witnesses.

ELIAS L. VICKERS.

Witnesses:
  W. M. THURMAN,
  M. S. SMITH.